(12) United States Patent
Miksovsky et al.

(10) Patent No.: US 7,689,064 B2
(45) Date of Patent: Mar. 30, 2010

(54) MEDIA DISPLAY COLLAGES

(75) Inventors: Jan Thomas Miksovsky, Seattle, WA (US); Mark Douglas Bramley, Redmond, WA (US)

(73) Assignee: Cozi Group Inc., Seattle, WA (US)

( * ) Notice: Subject to any disclaimer, the term of this patent is extended or adjusted under 35 U.S.C. 154(b) by 649 days.

(21) Appl. No.: 11/238,750

(22) Filed: Sep. 29, 2005

(65) Prior Publication Data

US 2007/0074110 A1    Mar. 29, 2007

(51) Int. Cl.
    G06F 17/00    (2006.01)
(52) U.S. Cl. .................... 382/294; 715/210; 715/730
(58) Field of Classification Search ............... 382/294; 715/730
    See application file for complete search history.

(56) References Cited

U.S. PATENT DOCUMENTS

| | | | | |
|---|---|---|---|---|
| 4,463,380 A * | 7/1984 | Hooks, Jr. | ................ | 348/580 |
| 6,097,389 A * | 8/2000 | Morris et al. | ................ | 715/804 |
| 6,123,362 A * | 9/2000 | Squilla et al. | ................ | 283/67 |
| 6,222,637 B1 * | 4/2001 | Ito et al. | ................ | 358/1.18 |
| 6,259,457 B1 * | 7/2001 | Davies et al. | ................ | 345/629 |
| 6,288,719 B1 * | 9/2001 | Squilla et al. | ................ | 715/805 |
| 6,383,080 B1 * | 5/2002 | Link et al. | ................ | 463/47 |
| 6,396,963 B2 * | 5/2002 | Shaffer et al. | ................ | 382/305 |
| 6,549,679 B1 * | 4/2003 | Zheng | ................ | 382/284 |
| 7,028,255 B1 * | 4/2006 | Ayers | ................ | 715/202 |
| 7,117,453 B2 * | 10/2006 | Drucker et al. | ................ | 715/833 |
| 7,239,805 B2 * | 7/2007 | Uyttendaele et al. | ................ | 396/222 |
| 7,573,486 B2 * | 8/2009 | Mondry et al. | ................ | 345/619 |
| 2003/0095720 A1 * | 5/2003 | Chiu et al. | ................ | 382/284 |
| 2003/0160824 A1 * | 8/2003 | Szumla | ................ | 345/769 |
| 2005/0111737 A1 * | 5/2005 | Das et al. | ................ | 382/190 |
| 2005/0147322 A1 * | 7/2005 | Saed | ................ | 382/284 |
| 2005/0216838 A1 * | 9/2005 | Graham | ................ | 715/713 |
| 2005/0220345 A1 * | 10/2005 | Chiu et al. | ................ | 382/190 |
| 2006/0072848 A1 * | 4/2006 | Razzano | ................ | 382/284 |
| 2006/0120624 A1 * | 6/2006 | Jojic et al. | ................ | 382/284 |
| 2006/0120625 A1 * | 6/2006 | Peleg et al. | ................ | 382/284 |
| 2007/0031062 A1 * | 2/2007 | Pal et al. | ................ | 382/284 |
| 2007/0058884 A1 * | 3/2007 | Rother et al. | ................ | 382/284 |
| 2007/0110335 A1 * | 5/2007 | Taylor et al. | ................ | 382/284 |

* cited by examiner

*Primary Examiner*—Bhavesh M Mehta
*Assistant Examiner*—Stephen R Koziol
(74) *Attorney, Agent, or Firm*—Christensen O'Connor Johnson Kindness PLLC

(57) ABSTRACT

A system and method for generating collections of media are provided. A media collage is constructed such that all its contained media, such as digital images, are selected and organized according to an associated characteristic. Sequential media collages can be generated by the same selection and organization approach.

19 Claims, 9 Drawing Sheets

MEDIA DISPLAY COLLAGES

FIELD OF THE INVENTION

In general, the present application relates to computer software and computer displays, and in particular, to a system and method for grouping electronic media into collages.

BACKGROUND OF THE INVENTION

People enjoy viewing photographs and other media on displays controlled by a computer. Existing computer hardware and software systems for displaying images are generally designed to focus the viewer's attention on a single image at a time. For example, a computer might display a single image at a time, stretching or shrinking the image to fill the display while maintaining the image's original aspect ratio (the proportional relationship between the image's width and height).

Historically, people have enjoyed viewing images that have been physically arranged in a collage. Various attempts have been made to let people view collages of images on a computer. In some cases, a system may allow a user to manually arrange images in a collage, but such a task consumes a great deal of the user's time and effort. Systems exist that can programmatically generate a collage of images, but current techniques suffer from a variety of deficiencies. In one aspect, programmatic approaches are computationally expensive and they make too many assumptions about the nature of images (e.g., require that all images have similar proportions. In another aspect, programmatic approaches may not allow for display of the entire image (an image may be cropped, or a significant portion of an image may obscured by another image) or generate results are not aesthetically pleasing (for example, there may be too much empty space). In another aspect, programmatic approaches can result in the generation of collages of completely random images that have nothing in common. Accordingly, these automatic collages are not generally interesting to view.

A common type of computer software image display application, generally referred to as a "screen saver," displays information of visual interest on a computer display when a computer is not in use. Many screen savers exist that display a slideshow of images, typically showing a single image at a time. Screen savers have not generally attempted to display a slideshow of programmatically generated collages, presumably because of the deficiencies noted above.

SUMMARY OF THE INVENTION

A system and method for generating collections of media are provided. A media collage is constructed such that all its contained media, such as digital images, are selected and organized according to an associated characteristic. Sequential media collages can be generated by the same selection and organization approach.

In accordance with an aspect of the present invention, a method for organizing images on a target area is provided. In accordance with the method, an image organization system obtains a set of images. The set of images are organized according to selection criteria. The image organization system divides the target area into at least two sub-areas, which can correspond to quadrants. For each sub-area, the image organization system arranges at least one image from the set of images into the sub-area. Additionally, the image organization system renders the target area with the arranged images.

In accordance with another aspect of the present invention, a method for organizing images on a target area is provided. In accordance with the method, an image organization system obtains a set of images. The set of images are selected from a group of images according to organizational criteria. The image organization system divides the target area into quadrants determined by an origin of the target area. For each quadrant, the image organization system at least one image from the set of images into the sub-area. Additionally, the image organization system renders the target area with the selected images.

In accordance with a further aspect of the invention, a computer-readable medium having computer-executable components for organizing images on a target area is provided. The computer-executable components include an image sorting component for obtaining a set of images and organizing the set of images into one or more subsets according to selection criteria. The computer-executable components also include an image collage generator component for selecting a subset of images to render. The computer-executable components further include an image collage layout engine component for subdividing the target area into one or more sub-areas and for selecting at least one image from the selected subset of images for each sub-area. Additionally, the computer-executable components include an image collage renderer for rendering the target area with the selected images from the subset of images.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a system and method for processing media items. In particular, the present invention relates to a system and method for generating collages of media items. In one embodiment of the present invention, the media items correspond to digital video and/or still images. Additionally, in one embodiment of the present invention, the collages of media items correspond to the generation of the collages on a computer display. One skilled in the relevant art will appreciate that the disclosed embodiments are illustrative in nature and should not be construed as limiting.

Figure 1:
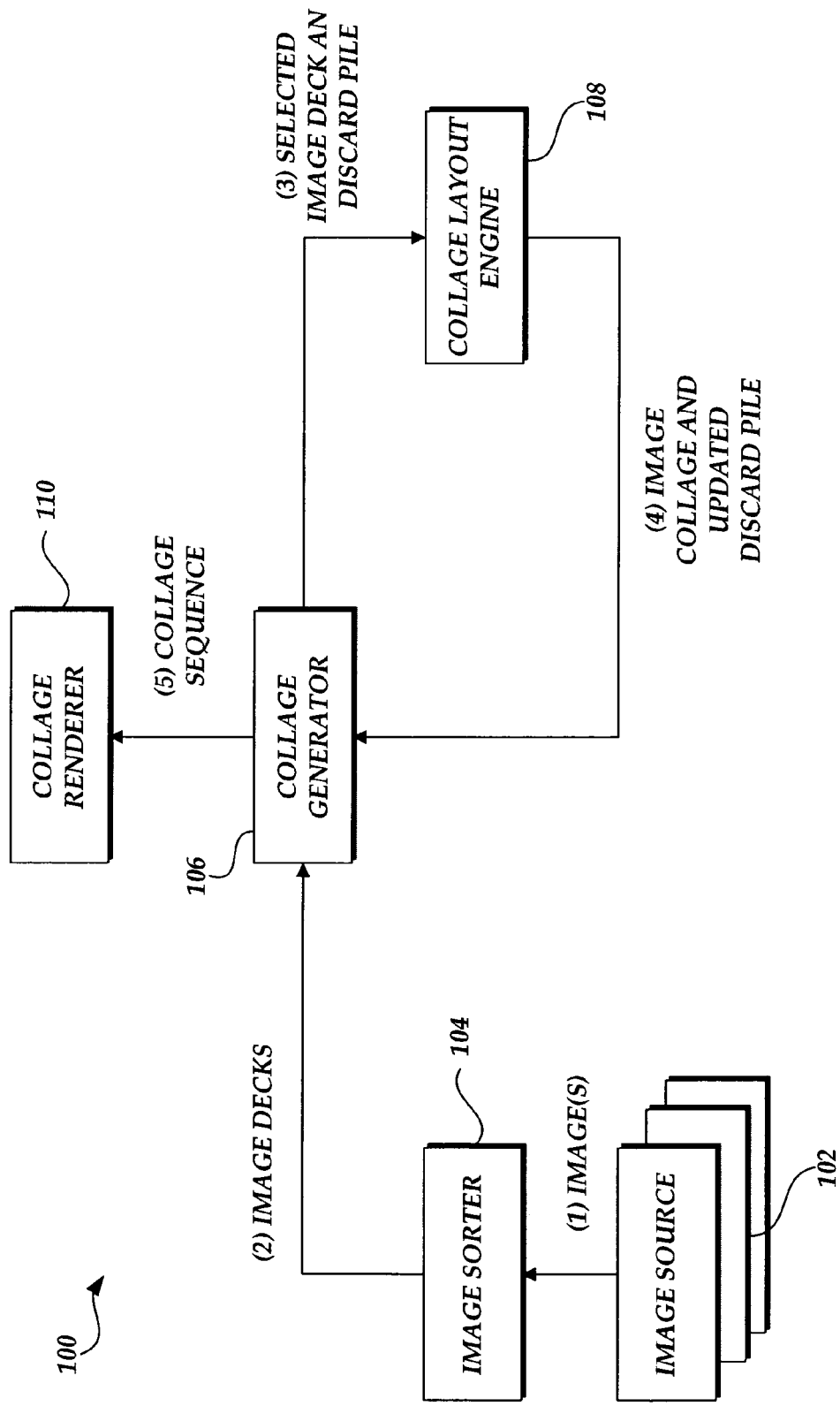
FIG. 1 is a block diagram illustrative of a system for processing and organizing media items in accordance with an aspect of the present invention.

FIG. 1 is a block diagram illustrative of a system 100 for processing and organizing media items in accordance with an aspect of the present invention. The components of the system 100 may correspond to components of a software application, such as a stand-alone software application or operating environment, operable to generate a sequence of collages from image sources. The system 100 may be incorporated into a wide variety of computing devices, including, but not limited to, personal computing devices, hand-held computing devices, mobile telephones, networked computing devices, terminals, and consumer devices.

Turning to FIG. 1, the system 100 includes one or more image sources 102 that contain or can otherwise produce a collection of images for generation of the media item collages. The image sources 102 can be provided from various devices/components such as a computer disk, a web service, etc. In an illustrative embodiment, the digital images can be photographs, artwork, scanned images, real time video/still images, and the like. The images may be defined in any form that allows for determination of the image's aspect ratio: the proportional relationship between the image's width and height. For example, photographs taken with many current digital cameras will often have an aspect ratio of 4:3 or 3:4. An image can generally be scaled—i.e., stretched or shrunk—as long as its aspect ratio is maintained. In one embodiment, the images may include meta-data that define various characteristics of the images, such as an aspect ration. In another embodiment, various image characteristics may be measured or otherwise determined. One skilled in the art will recognize that the present invention can be applied not just to images, but to other visual representations of information.

In accordance with an aspect of the present invention, the images from the image sources 102 are organized into one or more "decks." The images in any given deck have in common some property or properties that can be determined. The present invention maintains a deck as an ordered list of images. As with a deck of cards, an image may be drawn from the "top" of the deck; i.e., the next image in the deck's order is removed. A deck can be reconstituted by shuffling images from it into a new order.

With continued reference to FIG. 1, the system 100 also includes an image sorter 104 that receives images from the collection of images and, based on properties of those images, groups them into different decks. In one embodiment, the property or properties can be selected such that each image will belong to exactly one deck. For example, the common property might be the month the image was taken, or the image's file system storage location (i.e., all the images in a given set are stored in the same folder), or a dominant visual color. In another example, the properties may be one or more visual characteristics determined from each image. For example, one property may be a location associated with each of the images. In another example, another property may be an individual or group of individuals associated with each of the images. In a further example, the common property may correspond to user criteria, such as image ratings or annotations. In one embodiment, the properties of the images may be obtained from meta-data associated with the image, such as information provided automatically by a camera (e.g., GPS coordinates) or manually entered by a user. In an illustrative embodiment of the present invention, the image sorter 104 shuffles each deck into a random order before returning the collection of image decks.

The collection of image decks may cover all images included in the collection of images from the image sources 102, or the sorting process may be such that the collection of image decks includes only a subset of available images. In an illustrative embodiment, the image sorter 104 does not include empty decks in the collection of image decks. Additionally, if the collection of images is empty, then the collection of image decks will be empty as well.

The system 100 further includes a collage generator 106 that obtains the collection of images decks from the image sorter 104. The collage generator 106 selects an image deck from which a collage will be constructed. In an illustrative embodiment of the present invention, the image deck selection is made randomly but weighted according to various selection criteria. For example, the collage generator 106 may weigh the deck selection according to the size of each deck; i.e., the collage generator is twice as likely to select a deck A that contains twice as many images as another deck B. Similarly, the collage generator 106 may weigh according to user specified criteria.

In an illustrative embodiment of the present invention, the system 100 may include additional processing such that no one image from a given deck should appear too often in collages nor should any combination of images appear too often together in the same collage. Additionally or alternatively, the system 100 may include additional processing such that no one image appear twice in the same collage. Accordingly, the collage generator 106 can associate with each deck a "discard pile" that tracks which images from that deck have already been used in recent collages. The discard pile can be initially empty or pre-loaded with information from previous collage generation iterations.

The system 100 further includes a collage layout engine 108 for generating an image collage from the selected image deck. Specifically, the collage generator 106 invokes the collage generator 106, passing it a reference to the selected image deck, as well as a reference to the discard pile associated with that deck. In return, the collage layout engine 108 produces a selection of images into a single collage. In an illustrative embodiment, the collage layout engine 108 generates a list of records, each record indicating an image, and a position and size that will be eventually used to render the image. Additionally, the collage layout engine 108 updates the referenced image deck and its corresponding discard pile. As discussed in greater detail below, an emptied image deck may be replenished by reshuffling its corresponding discard pile. A routine for generating a collage of selected images will be described with regard to FIG. 2.

The system 100 also includes a collage renderer 110 that renders a sequence of collages for display. In an illustrative embodiment of the present invention, the rendering of a sequence of collages can correspond to a slideshow on a computer display. Rendering generally consists of displaying each image in a collage on the display device in the indicated position and at the indicated size. Rendering can occur immediately, or the collage can be stored for later use. In the latter case, if a collage is ultimately rendered on a final display other than the originally intended display, the collage renderer 110 may have to scale and position the collage to accommodate the actual dimensions and aspect ratio of the final display.

Figure 2:
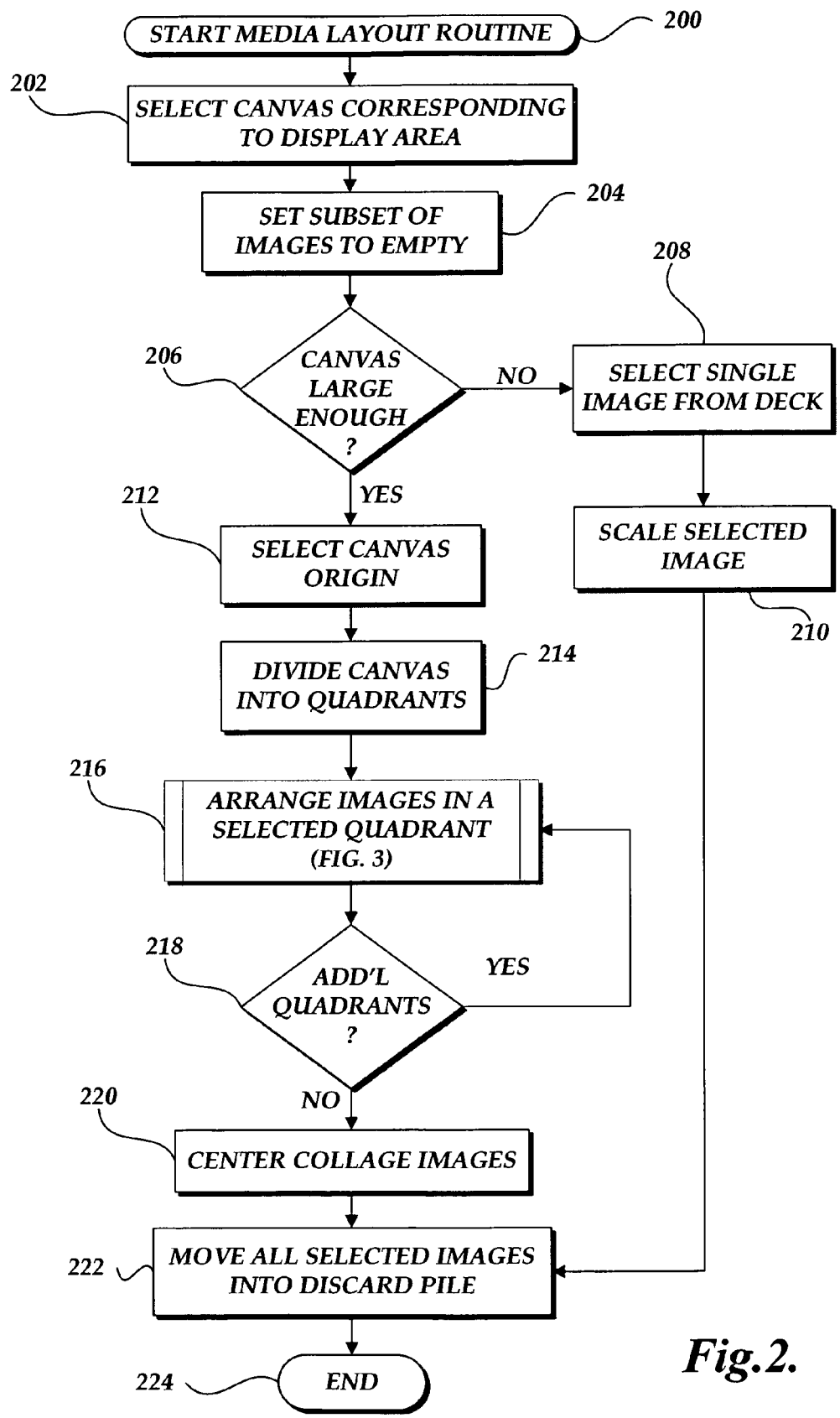
FIG. 2 is a flow diagram illustrative of a media layout routine implemented by a layout engine in accordance with an aspect of the present invention.

FIG. 2 is a flow diagram illustrative of a media layout routine 200 implemented by a layout engine in accordance with an aspect of the present invention. At block 202, the collage layout engine 108 creates an empty canvas to contain the images that will be arranged in a collage. In an illustrative embodiment, the canvas has the same size as the intended display device that will be used by the collage renderer and can share the same aspect ratio as the intended display device. In an alternative embodiment, the canvas may be defined to occupy some subset of the available screen display.

At block 204, the collage layout engine 108 sets an identification of images from the selected deck to empty. At decision block 206, a test is conducted to determine whether the canvas is large enough to show a collage. In an illustrative embodiment, the determination may be based on a desired minimum size (height and width) at which an image should be shown. This minimum size can be defined as some fraction of the original image's physical dimensions (e.g., in pixels) or as some fraction of the dimensions of the canvas. The desired minimum size may be defined by the system 100 or user-specified. Additionally, in an illustrative embodiment, to construct a collage with four quadrants that are each large enough to contain an image, the width of the canvas should be sufficient to allow two images of the minimum width with a margin between the images and the canvas. Similarly, the height of the canvas should be sufficient to allow two images of the minimum height with a margin between the images and the canvas.

If the canvas is not sufficiently large enough to show a collage, at block 208, the collage layout engine 108 selects a single image from the image deck. At block 210, the collage layout engine 108 scales the selected image to fit the constraints of the canvas while preserving the image's aspect ratio. If the canvas itself is smaller than the minimum image size discussed in decision block 206, then the scaled image produced by the collage layout engine 108 will most likely be smaller than the minimum size. Alternatively, if the aspect ratio of the image differs from that of the canvas, the collage layout engine 108 centers the image horizontally and vertically within the canvas. The routine 200 then proceeds to block 222, which will be described in greater detail below.

Returning to decision block 206, if the canvas is sufficiently large to show a collage, at block 212, the collage layout engine 108 selects a point as the origin that will be used to partition the canvas into quadrants and to align the edges of the images. In an illustrative embodiment, at least one image at the minimum size to appear in each of the quadrants determined by this origin. Accordingly, the collage layout engine 108 attempts to select a point on the canvas that is the minimum image height and width away from the edge of the canvas and also allows for a margin between the edge of the canvas and an image, as well as a margin between images. In an illustrative embodiment of the present invention, the origin point is randomly determined, but weighted towards the center of the canvas. At block 214, the collage layout engine 108 divides the canvas into quadrants. One skilled in the relevant art will appreciate that the collage layout engine 108 may also subdivide the canvas into different sub-areas that may not necessarily correspond to quadrants.

Figure 4:
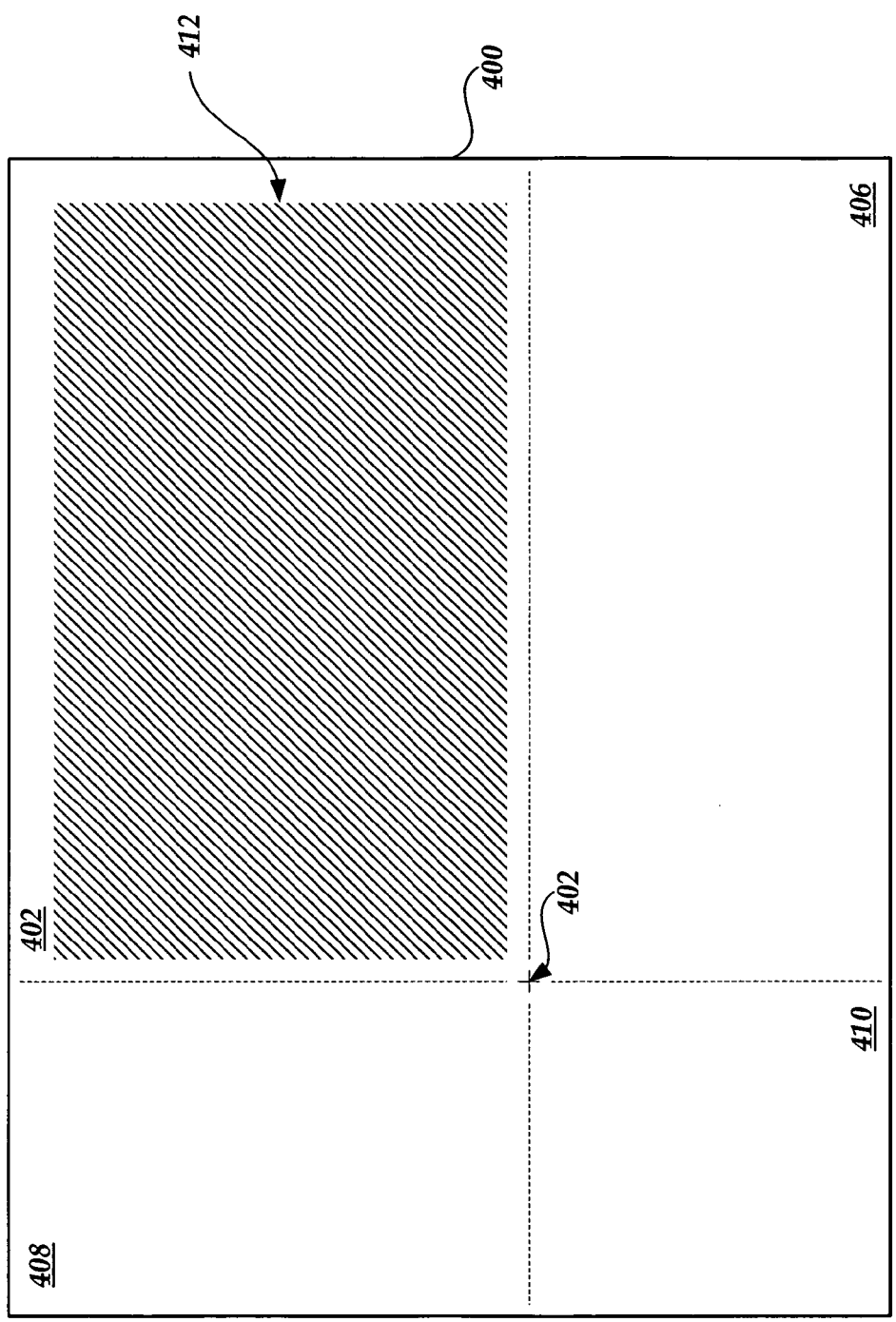
FIG. 4 is a block diagram illustrative of a screen display divided into multiple quadrants for displaying media items in accordance with an aspect of the present invention.

FIG. 4 is a block diagram illustrative of a screen display 400 divided into multiple quadrants for displaying media items in accordance with an aspect of the present invention. The screen display 400 includes an origin 402 that effectively divides the canvas into four quadrants 404, 406, 408, 410. As illustrated in FIG. 4, the quadrants 404, 406, 408, 410 maintain a margin between themselves and the edge of the canvas. In an illustrative embodiment, the quadrants can be ranked according to the size of the area they enclose. In FIG. 4, the largest quadrant is the upper-right quadrant 404, followed in decreasing order of size by quadrants 406, 408, 410.

Returning to FIG. 2, at block 216, the routine 200 enters a loop that arranges images in each quadrant. In an illustrative embodiment, the first iteration of block 216 begins with the largest quadrant and proceeds to the smallest quadrant. A sub-routine for arranging images in a quadrant will be described with regard to FIG. 3. At decision block 218, a test is conducted to determine whether additional quadrants remain. If so, the routine 200 returns to block 216 to arrange images on the next quadrant. For example, the routine 200 would arrange the images on the next largest quadrant.

If no quadrants remain, at block 220, the collage layout engine 108 centers the complete collage of images horizontally and vertically within each quadrant of the canvas. One skilled in the art will recognize that the degree to which a collage is visually balanced can be tuned to achieve different effects. For example, it may be desirable to leave a collage slightly unbalanced to retain some degree of visual tension. Accordingly, block 220 may be omitted. Returning to FIG. 2, at block 222, the collage layout engine 108 moves all images that have been added to the collage to the discard pile to reflect the fact that they have been used. The routine 200 terminates at block 224.

Figure 3:
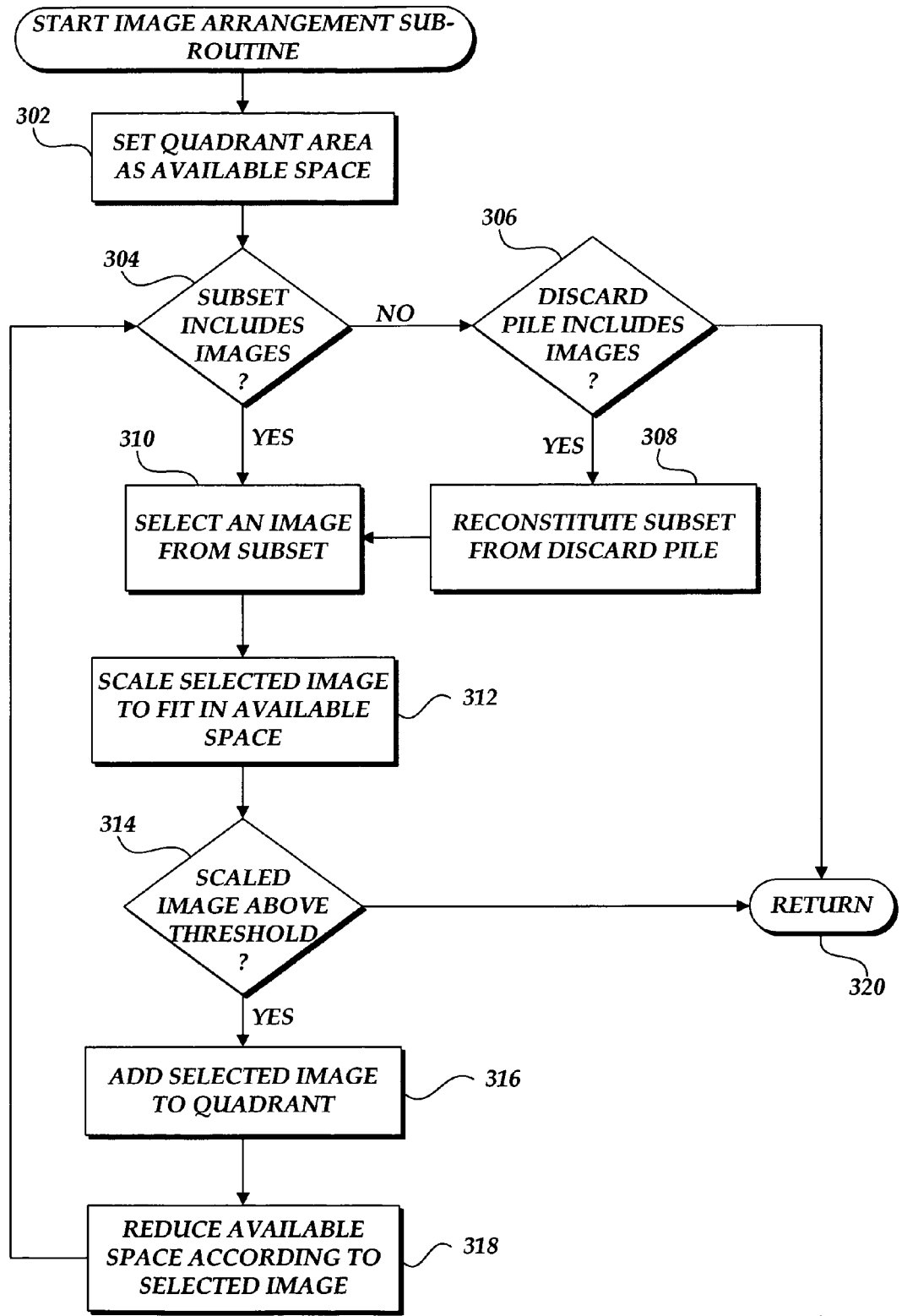
FIG. 3 is a flow diagram illustrative of a media arrangement sub-routine implemented by a layout engine in accordance with an aspect of the present invention.

FIG. 3 is a flow diagram illustrative of a media arrangement sub-routine 300 implemented by the collage layout engine 108 arrange images within a selected quadrant and corresponding to block 216 (FIG. 2). At block 302, the collage layout engine 108 identifies an unoccupied region of the selected quadrant as the available space to which images can be added. With reference to FIG. 4, the available space in the first quadrant 404 is defined by space 412. At decision block 304, a test is conducted to determine whether the current image deck still contains any images. If the current image deck does not contain any images, at decision block 306, a test is conducted to determine whether the discard pile includes an images previously used. If no images remain in the discard pile, the sub-routine returns at block 320.

If one or more images are in the discard pile, at block 308, the collage layout engine 108 reconstitutes the image deck from the images in the discard pile. In an illustrative embodiment of the present invention, the collage layout engine 108 shuffles the newly reconstituted image deck into a random order. Additionally, the collage layout engine 108 may also prevent the current images in the other quadrants when reconstituting the image deck. If the current image deck still contains any images at decision block 304 or once the image deck is reconstituted at block 308, the collage layout engine 108 selects the top of the image deck, and moves the selected image from the image deck to be placed in the quadrant at block 310. At block 312, the collage layout engine 108 scales the selected image (while maintaining the image's aspect ratio) to be as large as possible while still subject to the constraints of the available space.

Figure 5:
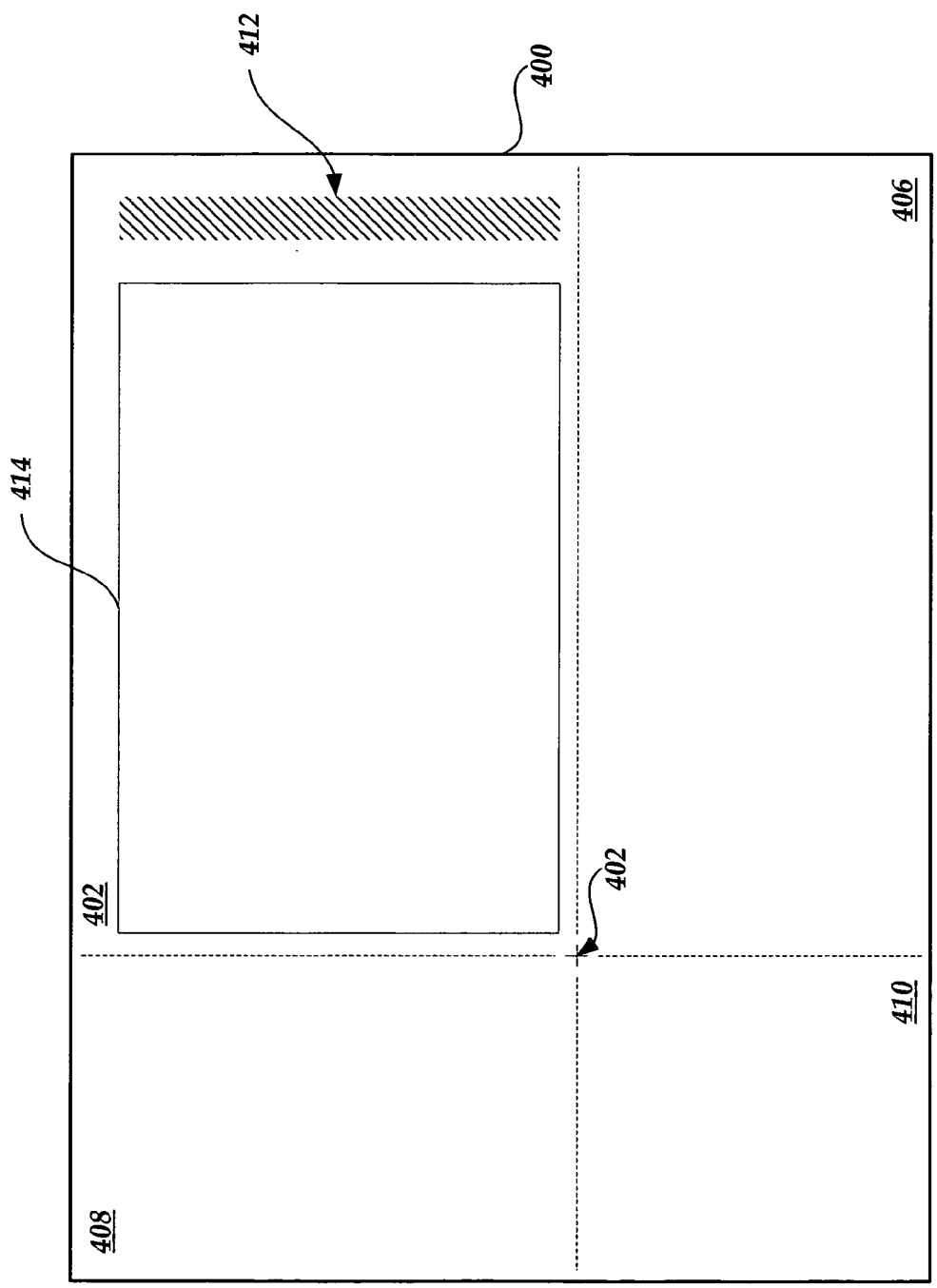
FIG. 5 is a block diagram of the screen display of FIG. 4 illustrating the placement of a media item in a media quadrant.

At decision block 314, a test is conducted to determine whether the scaled image is of a minimum size. If the scaled image is not of the minimum size, the sub-routine 300 returns at block 320. Alternatively, at block 316, the collage layout engine 108 positions the scaled image in the corner of the region that is closest to the origin. With reference to FIG. 4, an image 410 has been centered in quadrant 404. FIG. 5 is a block diagram of the screen display 400 of FIG. 4 illustrating the placement of a media item in a media quadrant in accordance with an aspect of the present invention. As illustrated in FIG. 5, a first image 414 from the image deck has been placed in the corner of the region of the first quadrant 404 most close to the origin 402.

Returning to FIG. 3, at block 318 reduces the area of available space to accommodate the scaled image. In an illustrative embodiment, the reduction in area includes the space consumed by the scaled image, and the space required to provide a suitable margin between photos. The sub-routine 300 then returns to decision block 320 to attempt to place another image in the quadrant.

With reference again to FIG. 5, by way of example, after the placement of image 414, a second image is considered for addition to the remaining available space 412. Because the available space is small, the collage layout engine 108 would likely determine that the image is not of the minimum size, and no more images will be added to this quadrant. Accordingly, the sub-routine 300 would return.

Figure 6:
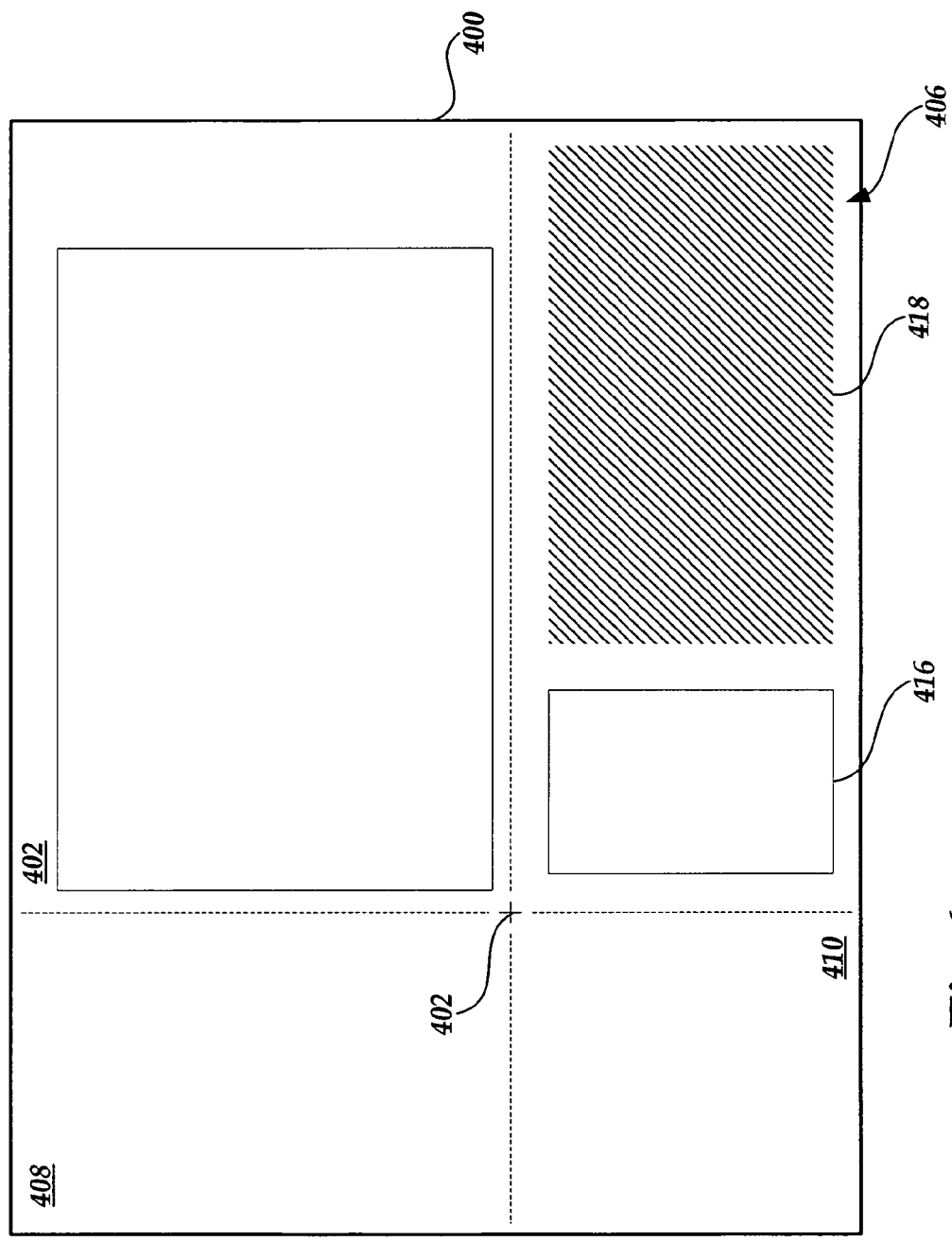
FIG. 6 is a block diagram of the screen display of FIG. 4 illustrating the placement of media items in a second quadrant.
Figure 7:
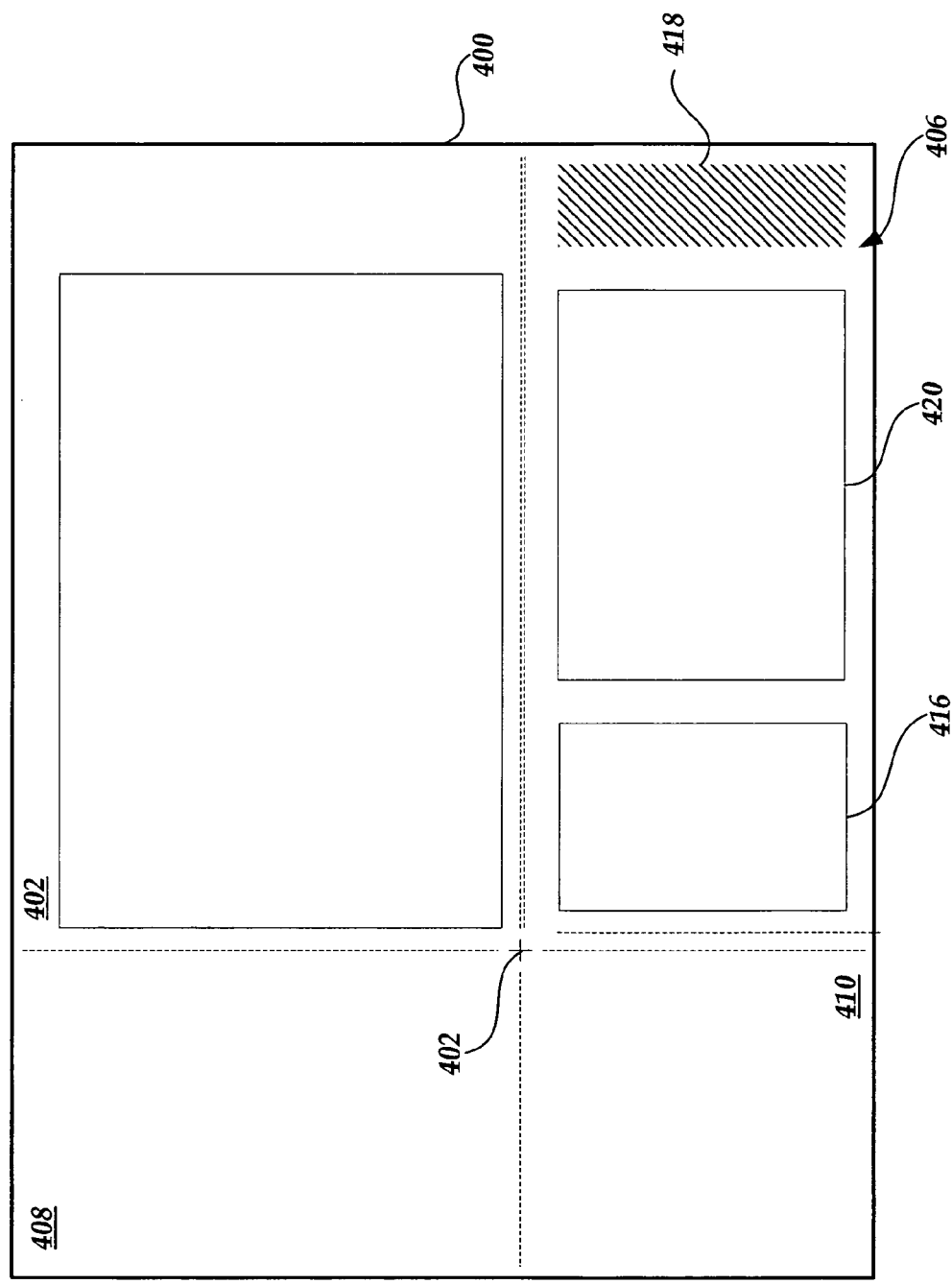
FIG. 7 is a block diagram of the screen display of FIG. 4 illustrating the placement of a multiple media items in the second media quadrant.

FIGS. 6-9 are a block diagram of the screen display 400 of FIG. 4 illustrating the placement of media items in various quadrants of the screen display. With reference to FIG. 6, a second image 416 has been added to screen display 400 in the quadrant 406. After this addition, the available space 418 is likely sufficiently large enough to contain another image. With reference to FIG. 7, the second quadrant 406 of the screen display 400 now includes a second image 420. However, after the second image has been added, the resulting available space 418 is now likely too small for more images to be added to that quadrant.

Figure 8:
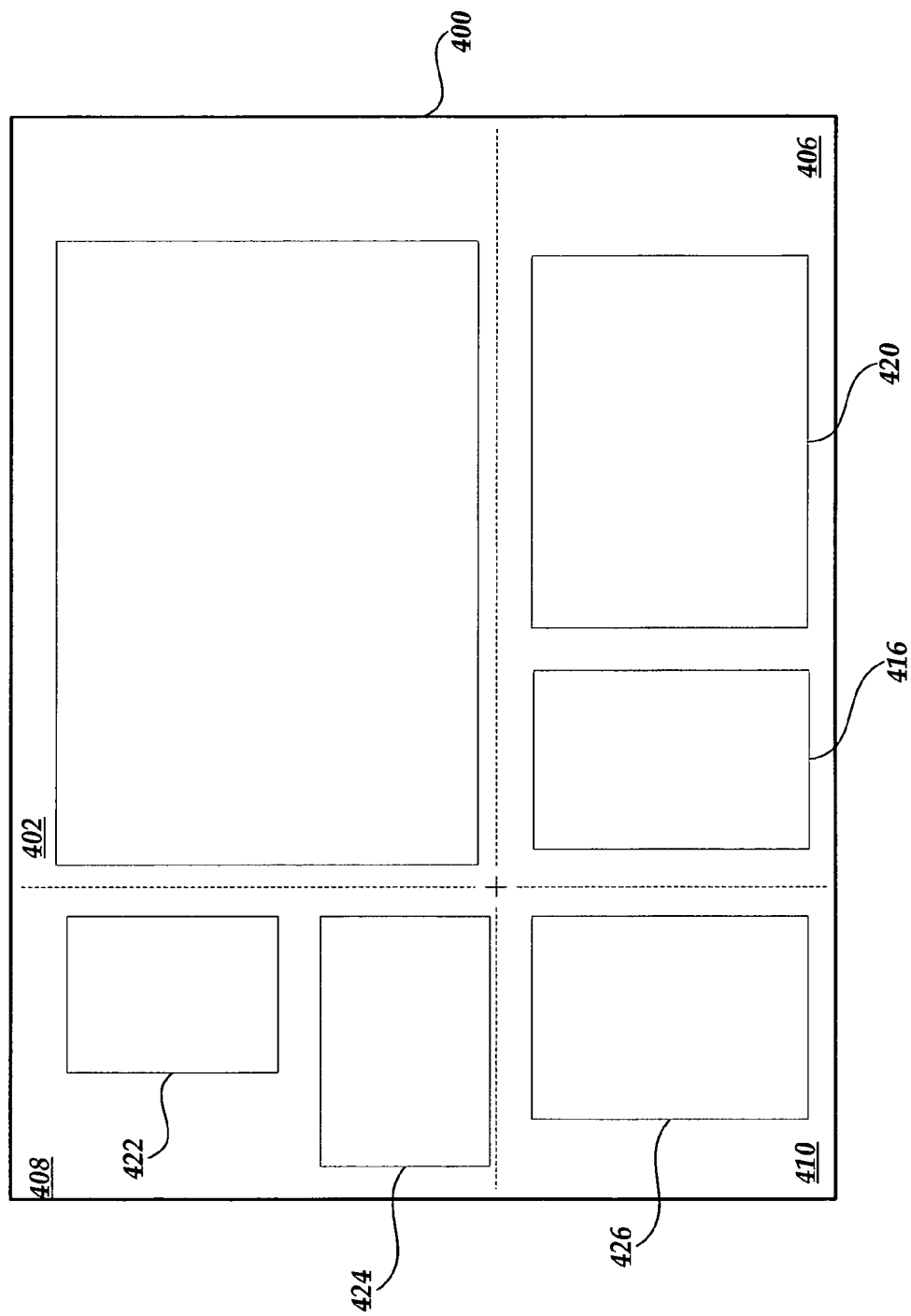
FIG. 8 is a block diagram of the screen display of FIG. 4 illustrating the placement of media items into all the media quadrants of the screen display.
Figure 9:
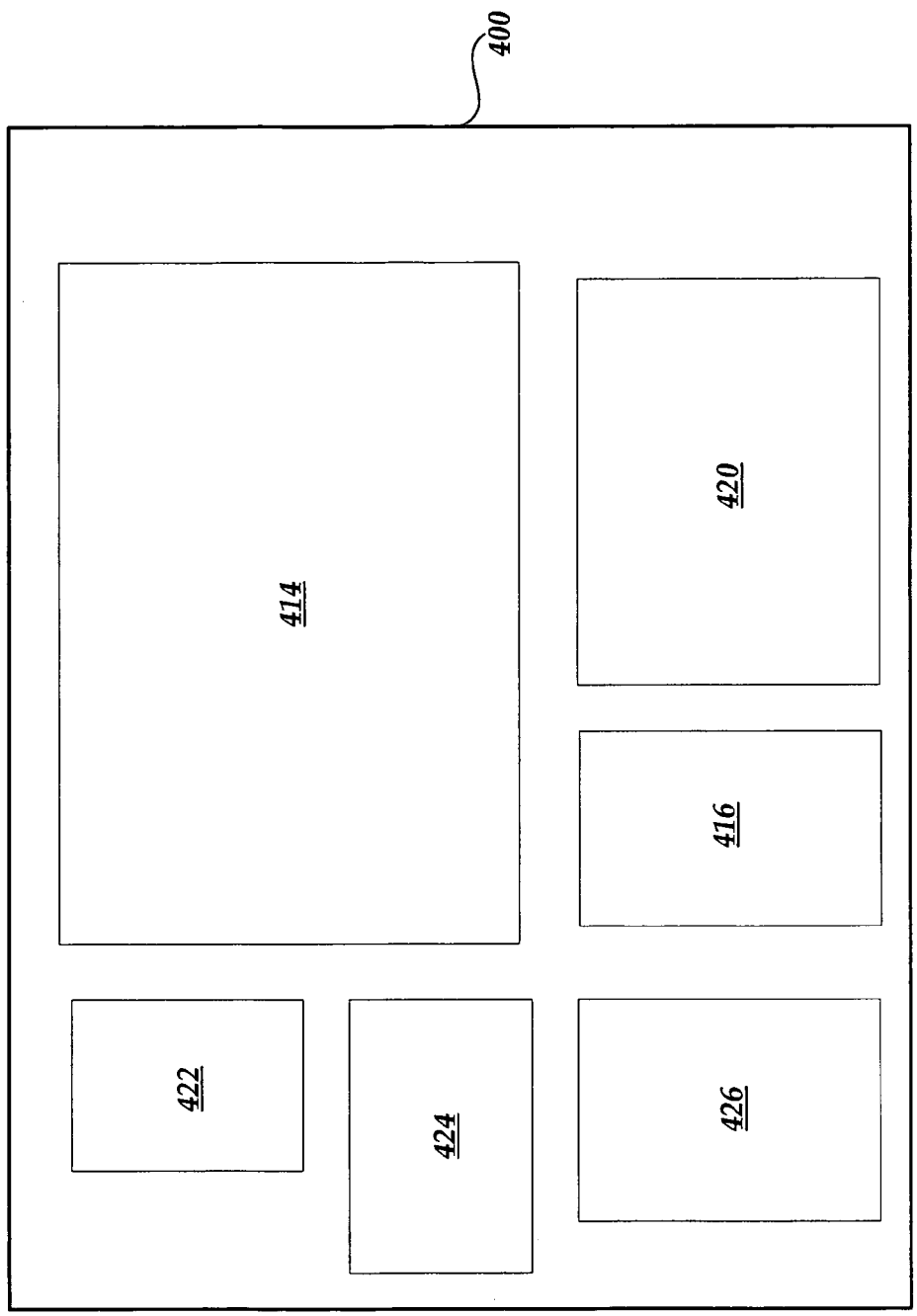
FIG. 9 is a block diagram of the screen display of FIG. 4 illustrating a resulting image collage with centered media items in each media quadrant.

With reference now to FIG. 8, after four iterations of sub-routine 300, the collage layout engine 108 has arranged images 414, 416, 420, 422, 424 and 426 in each of the quadrants 404, 406, 408, 410, respectively. FIG. 9 is a block diagram of the screen display 400 of FIG. 4 illustrating a resulting image collage with centered media images 414, 416, 420, 422, 424 and 426.

One skilled in the art will recognize that it is possible to relax certain constraints to achieve results that are still visually interesting. For example, it is possible to adjust the spacing between the images in the collage to achieve a looser or tighter visual effect. The edges of the images may even be allowed to overlap by a small amount while still generally preventing the significant content of an image (generally toward the image's center) from being obscured by another image. It is also possible to slightly rotate the images (e.g., by a random amount per image) to achieve a slightly more chaotic effect while nevertheless retaining a general visual alignment between images.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A computer-implemented method for organizing images on a target area, the method comprising:
    obtaining a set of images organized into a plurality of image subsets according to selection criteria;
    dividing the target area into four randomly sized quadrants along a vertical division and a horizontal division, the vertical division dividing the target area from a top edge of the target area to a bottom edge of the target area, the horizontal division dividing the target area from a left edge of the target area to a right edge of the target area, the horizontal division and vertical division meeting at an origin;
    choosing an image subset from the plurality of image subsets;
    for each quadrant, arranging at least one image from the chosen image subset into the quadrant, and for at least one quadrant, arranging more than one image from the chosen image subset into the quadrant, with a first image being arranged adjacent to the origin and subsequent images being arranged along the vertical division or the horizontal division towards the edge of the target area; and
    rendering the target area with the arranged images.

2. The method as recited in claim 1, wherein the set of images is organized into a plurality of image subsets according to date.

3. The method as recited in claim 1, wherein the set of images is organized into a plurality of image subsets according file system location.

4. The method as recited in claim 1, wherein arranging at least one image from the chosen image subset into the quadrant includes:
    removing the at least one image from the chosen image subset to prevent the at least one image from being arranged into the target area more than once.

5. A computer-implemented method for organizing images on a target area, the method comprising:
    obtaining a set of images organized into a plurality of image subsets according to organizational criteria;
    choosing an image subset from the plurality of image subsets;
    dividing the target area into quadrants determined by a randomly located origin of the target area, the quadrants defined by a vertical division and a horizontal division that pass through the origin and extend the entire height and width of the target area, respectively;
    for each quadrant, selecting at least one image from the chosen image subset for display in the quadrant, and for at least one quadrant, selecting more than one image from the chosen image subset for display in the quadrant; and
    rendering the target area with the selected images.

6. The method as recited in claim 5, wherein the set of images is organized into a plurality of image subsets according to a location associated with each image.

7. The method as recited in claim 5, wherein the set of images is organized into a plurality of image subsets according to user criteria specified for each image.

8. The method as recited in claim 5, wherein selecting at least one image from the chosen image subset for display in the quadrant includes:
    determining an available area within the quadrant;
    selecting a first image from the chosen image subset;
    arranging the first image in the quadrant at a position next to the origin; and
    arranging subsequent images from the chosen image subset along the vertical division or the horizontal division towards the edge of the target area;
    wherein less than all of the available area within the quadrant is used to arrange the first image in the quadrant.

9. The method as recited in claim 5 further comprising removing the at least one image from the chosen image subset to prevent the at least one image from being selected for display in the target area more than once.

10. The method as recited in claim 9 further comprising adding the at least one image to the chosen image subset to re-enable selection of the at least one image for display in the target area if the chosen image subset is empty.

11. The method as recited in claim 5, wherein rendering the target area includes generating a display image.

12. The method as recited in claim 5, wherein rendering the target area includes generating a print image.

13. A computer-readable medium having stored thereon computer-executable components for organizing images on a target area, the computer-executable components comprising:

an image sorting component for obtaining a set of images and organizing the set of images into a plurality of subsets according to selection criteria;

an image collage generator component for selecting a first image subset from the plurality of image subsets to render;

an image collage layout engine component for subdividing the target area into four quadrants of random size along a vertical division and a horizontal division, the vertical division dividing the target area from a top edge of the target area to a bottom edge of the target area, the horizontal division dividing the target area from a left edge of the target area to a right edge of the target area and meeting the vertical division at an origin, and for selecting at least one image from the first image subset for each quadrant and more than one image from the first image subset for at least one quadrant, with a first image being arranged adjacent to the origin and subsequent images being arranged along the vertical division or the horizontal division towards the edge of the target area; and an image collage renderer for rendering the target area with the selected images from the first image subset.

14. The computer-readable medium as recited in claim 13, wherein the image collage generator component is configured to select a second image subset to render, wherein the image collage layout engine component is configured to re-divide the target area into four randomly sized quadrants of different size than the previous four quadrants and to select at least one image from the second image subset for each quadrant, and wherein the image collage renderer is configured to clear the target area of images from the first image subset and to render the target area with the selected images from the second image subset.

15. The method as recited in claim 8, wherein arranging subsequent images from the chosen image subset along the vertical division or the horizontal division towards the edge of the target area further includes:

determining an available remaining area within the quadrant after arranging the first image;

selecting a second image from the chosen image subset;

scaling the second image to fit within the available remaining area while preserving the aspect ratio of the second image; and arranging the second image in the quadrant such that the first image is closer to the origin than the second image.

16. The method as recited in claim 4, wherein removing the at least one image from the chosen image subset comprises moving the at least one image to a discard image set associated with the chosen image subset.

17. The method as recited in claim 16 further comprising selecting a discarded image from the discard image set to be added back to the chosen image subset if the chosen image subset is empty, to re-enable arranging of the discarded image into the target area.

18. The method as recited in claim 17 further comprising randomly sorting the discard image set, and wherein selecting a discarded image from the discard image set comprises selecting a discarded image from a beginning of the sorted discard image set.

19. The method as recited in claim 8, wherein arranging subsequent images from the chosen image subset along the vertical division or the horizontal division towards the edge of the target area further includes:

determining an available remaining area within the quadrant after arranging the first image;

selecting a second image from the chosen image subset;

scaling the second image to fit within the available remaining area without cropping the second image; and arranging the second image in the available remaining area.

* * * * *

UNITED STATES PATENT AND TRADEMARK OFFICE
CERTIFICATE OF CORRECTION

| | |
|---|---|
| PATENT NO. | : 7,689,064 B2 |
| APPLICATION NO. | : 11/238750 |
| DATED | : March 30, 2010 |
| INVENTOR(S) | : J. T. Miksovsky et al. |

It is certified that error appears in the above-identified patent and that said Letters Patent is hereby corrected as shown below:

| COLUMN | LINE | ERROR |
|---|---|---|
| 8 | 12 | "file system location" should read |
| (Claim 3, | line 3) | --to file system location-- |

Signed and Sealed this
Seventeenth Day of July, 2012

David J. Kappos
*Director of the United States Patent and Trademark Office*